US010992081B2

(12) United States Patent
Masaki

(10) Patent No.: US 10,992,081 B2
(45) Date of Patent: Apr. 27, 2021

(54) CHARGING SOCKET AND BRACKET FOR CHARGING SOCKET

(71) Applicant: SUBARU CORPORATION, Tokyo (JP)

(72) Inventor: Shinichiro Masaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 21 days.

(21) Appl. No.: 16/410,788

(22) Filed: May 13, 2019

(65) Prior Publication Data

US 2019/0386433 A1 Dec. 19, 2019

(30) Foreign Application Priority Data

Jun. 14, 2018 (JP) .............................. JP2018-113239

(51) Int. Cl.
| | | |
|---|---|---|
| *H01R 13/62* | (2006.01) | |
| *H01R 13/633* | (2006.01) | |
| *B60L 53/16* | (2019.01) | |
| *H02J 7/00* | (2006.01) | |

(52) U.S. Cl.
CPC ............ *H01R 13/633* (2013.01); *B60L 53/16* (2019.02); *H02J 7/0045* (2013.01); *H01R 2201/26* (2013.01)

(58) Field of Classification Search
CPC ... H01R 13/633; H01R 2201/26; B60L 53/16; B60L 3/0007; B60L 11/1818; H02J 7/0045
USPC ......................................... 439/301, 310, 258
See application file for complete search history.

(56) References Cited

U.S. PATENT DOCUMENTS

| | | | | |
|---|---|---|---|---|
| 8,764,469 B2* | 7/2014 | Lamb | ..................... | H01R 13/62 439/258 |
| 9,320,156 B2* | 4/2016 | Ohmoto | ............... | H05K 5/0078 |
| 10,326,236 B1* | 6/2019 | Harmelink | ........... | H01R 12/716 |
| 2014/0081490 A1* | 3/2014 | Adelman | ................ | B23P 23/04 701/22 |
| 2014/0377970 A1* | 12/2014 | Crovetti | ............. | H01R 13/5213 439/131 |
| 2015/0151645 A1* | 6/2015 | Yamamaru | .............. | B60L 50/61 320/109 |
| 2016/0006156 A1* | 1/2016 | Shimizu | ............. | H01R 13/4367 439/310 |
| 2016/0072224 A1* | 3/2016 | Ichio | .................. | H01R 13/4367 439/345 |
| 2016/0118744 A1* | 4/2016 | Wittrock | ............ | H01R 13/5227 439/191 |
| 2019/0047426 A1* | 2/2019 | Effenberger | ....... | H01R 13/6272 |
| 2019/0386324 A1* | 12/2019 | Takasaki | ........... | H01M 8/04701 |

FOREIGN PATENT DOCUMENTS

JP 2002-262433 A 9/2002

* cited by examiner

*Primary Examiner* — Hae Moon Hyeon
(74) *Attorney, Agent, or Firm* — McGinn I.P. Law Group, PLLC.

(57) ABSTRACT

A charging socket includes a fixed part, a charging opening, and a break member. A fixed part is configured to be fixed to an electric vehicle. A charging opening is to be inserted to a power feeding connector for charging a battery of the electric vehicle. A break member is configured to break and separate the charging opening from the fixed part when a predetermined amount or more of load is applied to the charging opening.

20 Claims, 6 Drawing Sheets

CHARGING SOCKET AND BRACKET FOR CHARGING SOCKET

CROSS-REFERENCE TO RELATED APPLICATIONS

The present application claims priority from Japanese Patent Application No. 2018-113239 filed on Jun. 14, 2018, the entire contents of which are hereby incorporated by reference.

BACKGROUND

The disclosure relates to a charging socket and a bracket for the charging socket.

Electric motors that are driven by electric power are installed in an electric vehicle such as an electric car or a hybrid car. When the electric power of a battery for driving the electric motors is consumed, it is necessary to charge the battery by using external power feeding equipment. The external power feeding equipment is coupled to a power feeding cable having a power feeding connector at its tip. The battery is charged when the power feeding connector is inserted into a charging opening of the electric vehicle.

On the other hand, technologies of coupling a connector to a vehicle have been known. For example, Japanese Unexamined Patent Application Publication (JP-A) No. 2002-262433 discloses a connector bracket that integrates a vehicle-attached bracket and a connector bracket via a coupler. The vehicle-attached bracket is attached to a vehicle-side bracket, and a connector is attached to the connector bracket. The coupler breaks when impact of a set value or more is made on the connector bracket. At this time, the vehicle-attached bracket separates from the connector bracket. This assures safety of occupants.

SUMMARY

An aspect of the disclosure provides a charging socket including: a fixed part configured to be fixed to an electric vehicle; a charging opening to which a power feeding connector for charging a battery of the electric vehicle is inserted; and a break member configured to break and separate the charging opening from the fixed part when a predetermined amount or more of load is applied to the charging opening.

An aspect of the disclosure provides a bracket for a charging socket, the bracket including: a fixed part configured to be fixed to an electric vehicle; a coupler configured to be coupled to an inlet having a charging opening to which a power feeding connector for charging a battery of the electric vehicle is inserted; and a break member configured to break and separate the coupler from the fixed part when a predetermined amount or more of load is applied to the charging opening in a state where the inlet is coupled to the coupler.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
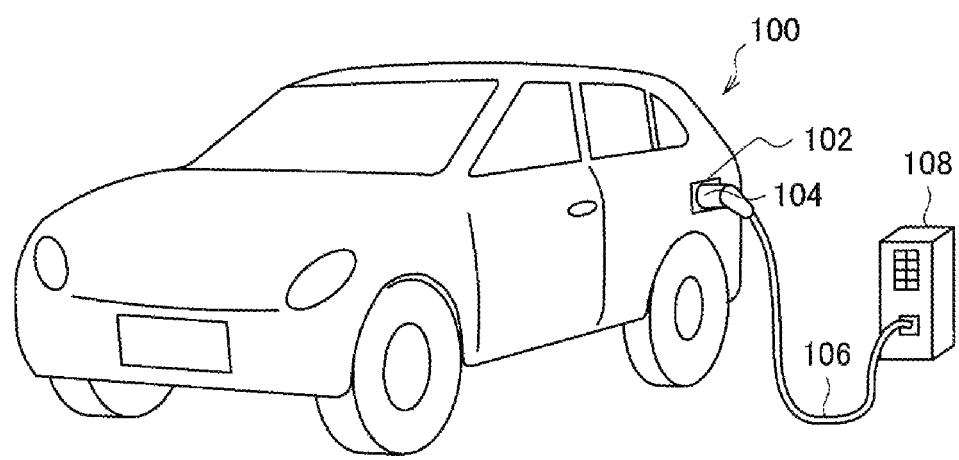
FIG. 1 is a perspective view of an electric vehicle that is being charged when viewed from a position in front of and to the left of the electric vehicle.

In the following, some embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. A charging opening of an electric vehicle is exposed to an outside of the electric vehicle. Therefore, sometimes a large load may be applied to the charging opening. For example, an unexpectedly large load is applied to the charging opening when a person trips over a power feeding cable or when a body of a person or an object bumps the charging opening. When a load is applied to the charging opening made in the vehicle body of the electric vehicle, the load is also applied to the vehicle body of the electric vehicle. When an excessive load is applied to the charging opening, problems occur such as deformation of the charging opening and the vehicle body of the electric vehicle. For example, it is difficult to repair the deformed vehicle body, and a repairing cost is necessary for repairing the deformed vehicle body.

However, the technology described in JP-A No. 2002-262433 is a technology based on an assumption of a situation in which a knee of an occupant hits a connector bracket installed near a driver's seat or feet of the occupant. In other words, the technology described in JP-A No. 2002-262433 is not designed for a situation in which a large load is applied to a connector bracket as described above. In addition, in general, the connector bracket installed under a driver's seat or a passenger seat is not designed for passing high current through a connector to charge a battery of an electric vehicle.

In addition, when a predetermined power of impact is made on a connector bracket part of the connector bracket described in JP-A No. 2002-262433, the connector bracket is divided into the connector bracket part separates and a vehicle-attached bracket part that is attached to the vehicle. In the case where a power feeding connector is coupled to the connector bracket part, the connector bracket part coupled to the power feeding connector separates from the vehicle-attached bracket part when impact is made on the connector bracket part. In the case where high current for charging a battery of an electric vehicle passes through a power feeding cable including the power feeding connector, problems occur such as electric leakage from the power feeding connector when the connector bracket part separates from the vehicle-attached bracket.

Accordingly, it is desirable to provide a novel and improved charging socket and bracket for the charging socket that make it possible to reduce a load applied to a vehicle body of an electric vehicle when the load is applied to a charging opening.

1. Electric Vehicle

FIG. 1 is a perspective view of an electric vehicle 100 that is being charged when viewed from a position in front of and to the left of the electric vehicle 100. The electric vehicle 100 may be an electric car that uses only one or more electric motors for propulsion, or a hybrid vehicle that uses both electric motors and an engine for propulsion. For example, the electric vehicle 100 runs by using electric power from a battery such as a lithium-ion battery or a nickel metal hydride battery.

To the electric vehicle 100, a charging socket 214 (not illustrated in FIG. 1 but to be described later) is fixed. The charging socket 214 has a charging opening 102 to which a power feeding connector 104 is inserted. In the embodiment, the charging socket 214 having the charging opening 102 is fixed to a rear left side portion of the electric vehicle 100. Note that, the position of the charging socket 214 is not limited thereto. The charging socket 214 may be fixed to a rear right side portion of the electric vehicle 100, or may be fixed to any portion such as both a front left side portion and a front right side portion, or a front portion, or a rear portion of the electric vehicle 100.

A power feeding cable 106 is coupled to power feeding equipment 108 external to the electric vehicle 100. The power feeding cable 106 includes a power feeding connector 104 at its tip. The power feeding connector 104 is detachably inserted into the charging opening 102. When the power feeding connector 104 is inserted into the charging opening 102, the power feeding equipment 108 transmits electric power to a battery of the electric vehicle 100 via the power feeding cable 106. The battery of the electric vehicle 100 is charged in such a way.

Figure 2:
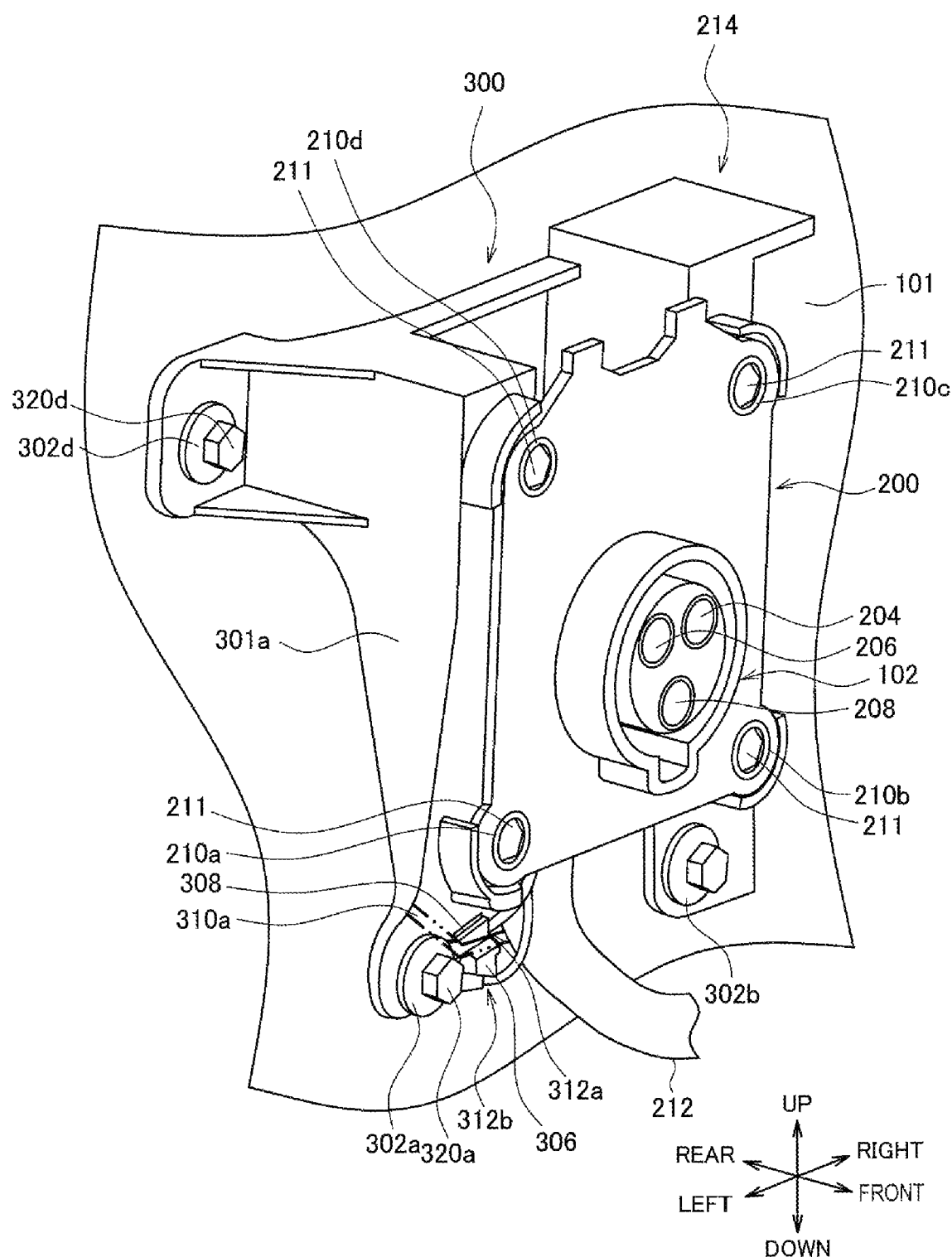
FIG. 2 is a perspective view of a charging socket according to an embodiment of the present disclosure when viewed from a position in front of and to the left of the charging socket, the charging socket being fixed to a vehicle body of the electric vehicle.
Figure 3:
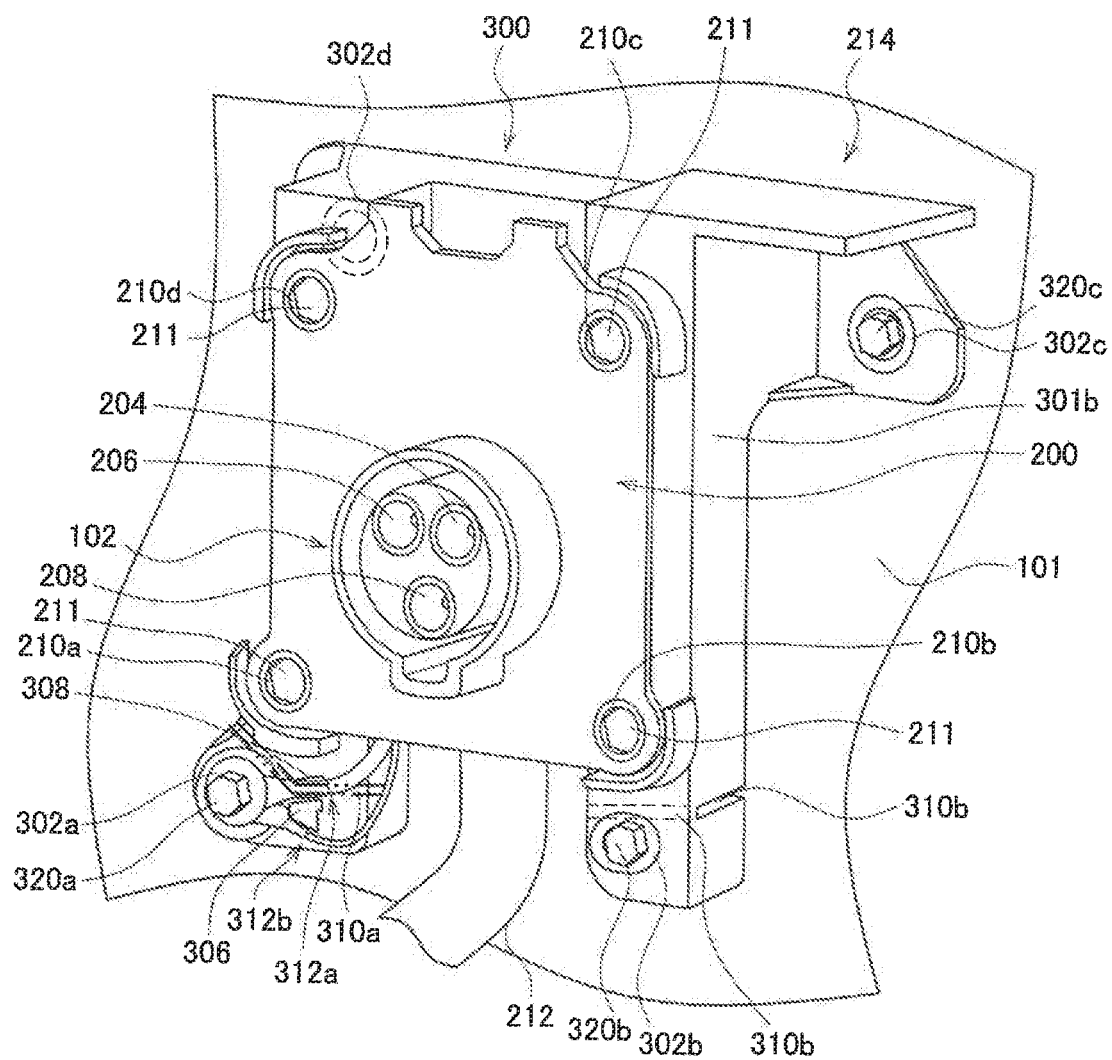
FIG. 3 is a perspective view of the charging socket according to the embodiment when viewed from a position in front of and to the right of the charging socket, the charging socket being fixed to the vehicle body of the electric vehicle.
Figure 3:
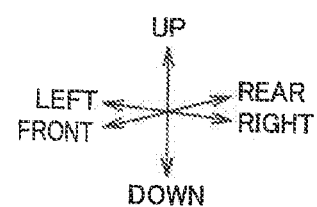

2. Charging Socket and Bracket for Charging Socket According to Embodiment 2-1. Charging Socket According to Embodiment FIG. 2 is a perspective view of the charging socket 214 according to the embodiment when viewed from a position in front of and to the left of the charging socket 214, the charging socket 214 being fixed to a vehicle body 101 of the electric vehicle 100. FIG. 3 is a perspective view of the charging socket 214 according to the embodiment of the disclosure when viewed from a position in front of and to the right of the charging socket 214, the charging socket 214 being fixed to the vehicle body 101 of the electric vehicle 100.

The charging socket 214 includes a bracket 300 and an inlet 200. The bracket 300 is fixed to the vehicle body 101, and the inlet 200 is positioned outside of the bracket 300 with respect to the vehicle body 101. The charging opening 102 to which the power feeding connector 104 is inserted is made near a center of a front surface of the inlet 200.

The inlet 200 has a substantially quadrilateral shape. The substantially quadrilateral inlet 200 includes a first coupler 210a, a second coupler 210b, a third coupler 210c, and a fourth coupler 210d at its four corners. Hereinafter, the couplers 210a, 210b, 210c, and 210d of the inlet 200 are referred to as inlet side couplers 210 by omitting the alphabets attached to the end of the reference signs, in a case where it is not necessary to particularly distinguish the couplers 210a, 210b, 210c, and 210d. Each of the inlet side couplers 210 has a hole to which a coupling bolt 211 is inserted into the inlet 200. The coupling bolts 211 are bolts for coupling the inlet 200 to the bracket 300.

The coupling bolts 211 are inserted into the respective inlet side couplers 210, and the coupling bolts 211 are tightened on the bracket 300. Accordingly, the inlet 200 is fixed to the bracket 300. In such a way, the inlet 200 is coupled to the bracket 300.

FIG. 2 and FIG. 3 include arrows that represent directions of up, down, left, right, front, and rear. The directions of up, down, left, right, front, and rear used here are defined regardless of directions of left, right, front, rear of the electric vehicle 100. The direction represented by an arrow from front to rear in FIG. 2 and FIG. 3 is a direction from the inlet 200 to the vehicle body 101, the direction being perpendicular to a surface of the inlet 200 on which the inlet side couplers 210 are installed. The direction represented by an arrow from left to right is a direction from the first coupler 210a to the second coupler 210b. The direction represented by an arrow from down to up is a rough direction from the first coupler 210a to the fourth coupler 210d, the direction being perpendicular to both the direction represented by the arrow from left to right and the direction represented by the arrow from front to rear.

The bracket 300 includes a first fixed part 302a, a second fixed part 302b, a third fixed part 302c, and a fourth fixed part 302d. Hereinafter, the fixed parts 302a, 302b, 302c, and 302d are referred to as fixed parts 302 by omitting the alphabets attached to the end of the reference signs, in the case where it is not necessary to particularly distinguish the fixed parts 302a, 302b, 302c, and 302d. The fixed parts 302 are formed by creating holes in the bracket 300.

A first bolt 320, a second bolt 320b, a third bolt 320c, and a fourth bolt 320d are respectively inserted into the first fixed part 302a, the second fixed part 302b, the third fixed part 302c, the fourth fixed part 302d. Hereinafter, the bolts 320a, 320b, 320c, and 320d are referred to as fixing bolts 320 by omitting the alphabets attached to the end of the reference signs, in the case where it is not necessary to particularly distinguish the bolts 320a, 320b, 320c, and 320d. The fixing bolts 320 inserted into the respective fixed parts 302 are tightened on the vehicle body 101. Accordingly, the bracket 300 is fixed to the vehicle body 101. In such a way, the charging socket 214 including the bracket 300 is fixed to the vehicle body 101 of the electric vehicle 100.

The inlet 200 has the charging opening 102 to which the power feeding connector 104 is detachably inserted. The charging opening 102 includes a minus terminal 204, a plus terminal 206, and a ground terminal 208. A charging cable 212 is coupled to a back side of the charging opening 102. The charging cable 212 is a cable for supplying electric power to the battery of the electric vehicle 100. When the power feeding connector 104 is inserted into the charging opening 102, a plus terminal and a minus terminal of the power feeding connector 104 are coupled to the minus terminal 204 and the plus terminal 206. Accordingly, electric power of the power feeding equipment 108 is supplied to the battery of the electric vehicle 100 via the power feeding cable 106 and the charging cable 212.

In addition, when the power feeding connector 104 is inserted into the charging opening 102, a ground terminal of the power feeding connector 104 is coupled to the ground terminal 208. As described later, the ground terminal 208 is grounded to the vehicle body 101. Therefore, the power feeding connector 104 is grounded to the vehicle body 101. Since the power feeding connector 104 is grounded, it is possible to prevent electric shock or the like from the power feeding connector 104.

2-2. Bracket According to Embodiment

The bracket 300 has a left side wall 301a on a left side of the bracket 300, and has a right side wall 301b on a right side of the bracket 300. As illustrated in FIG. 2, the left side wall 301a is formed in the up-down direction from the first fixed part 302a to the fourth fixed part 302d. For example, the thickness of the left side wall 301a in the left-right direction is a substantially similar to a length from a left end of the left side wall 301a to a left end of the inlet 200. In addition, the thickness of the left side wall 301a in the left-right direction is a substantially even thickness between the first fixed part 302a to the fourth fixed part 302d. In addition, the thickness of the left side wall 301a in the front-rear direction gradually gets thinner as extending toward the down direction from the fourth fixed part 302d. The thickness of the left side wall 301a in the front-rear direction becomes the thinnest near a first break member 310a (to be described later). Therefore, the thickness of the bracket 300 in the front-rear direction becomes the thinnest near the first break member 310a in the area between the first fixed part 302a and the fourth fixed part 302d.

On the other hand, as illustrated in FIG. 3, the right side wall 301b is formed in the up-down direction from the second fixed part 302b to the third fixed part 302c. For example, the thickness of the right side wall 301b in the left-right direction is a substantially similar to a length from a right end of the right side wall 301b to a right end of the inlet 200. The thickness of the right side wall 301b in the left-right direction is a substantially even thickness between the second fixed part 302b and the third fixed part 302c. The thickness of the right side wall 301b in the front-rear direction becomes the thickest near the third fixed part 302c. In an area below the position near the third fixed part 302c, the thickness of the right side wall 301b in the front-rear direction is substantially even thickness and is thinner than the thickness near the third fixed part 302c.

Figure 4:
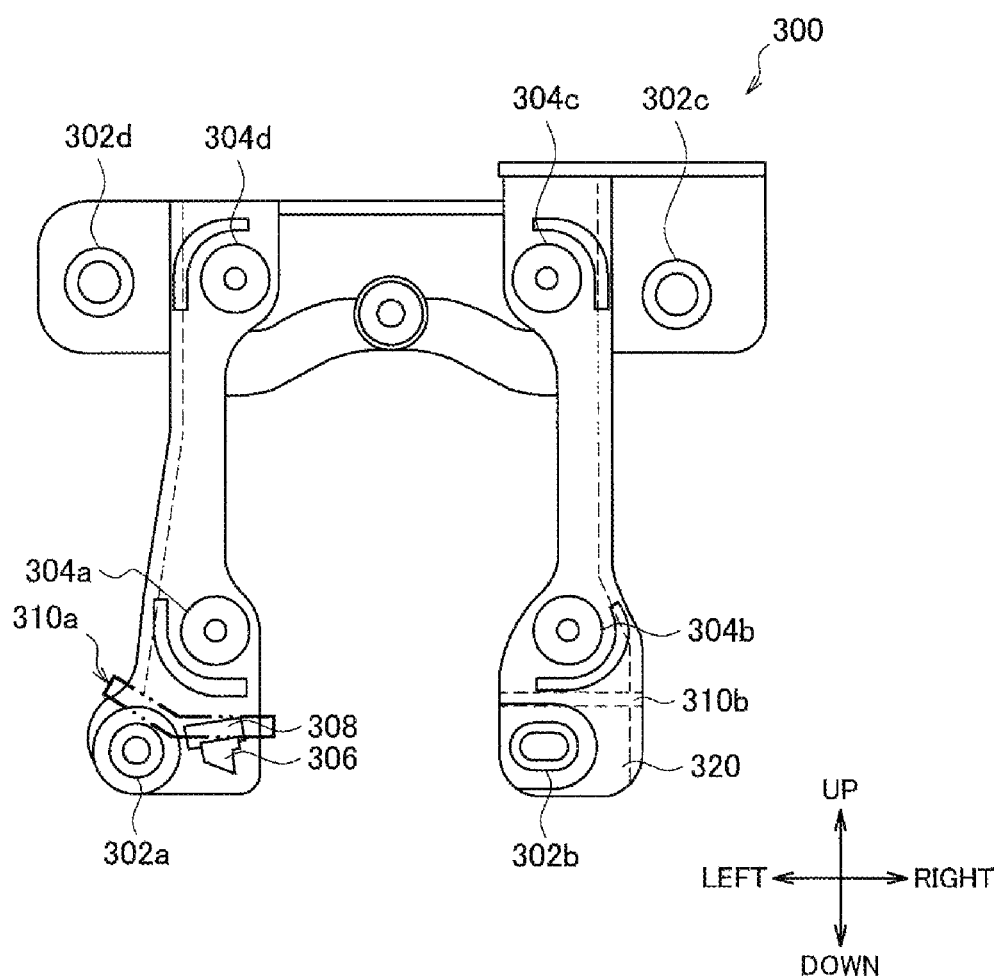
FIG. 4 is a diagram illustrating a front surface of a bracket according to the embodiment.
Figure 5:
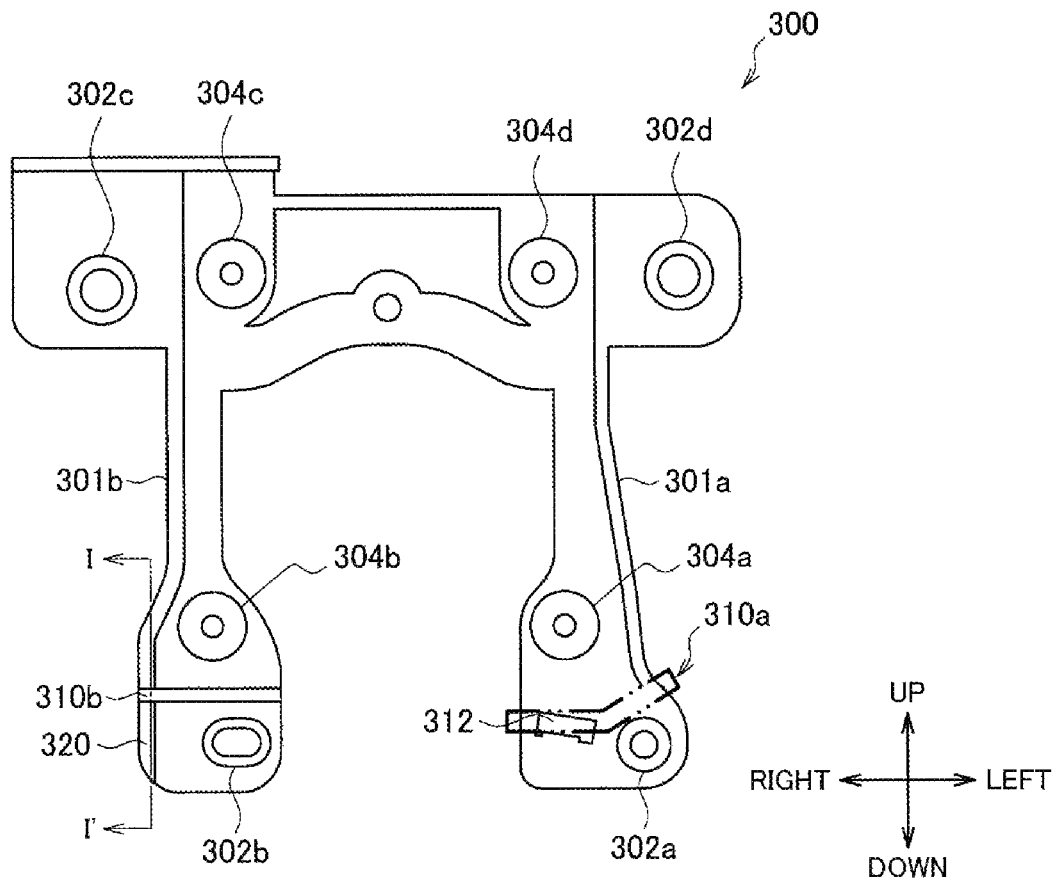
FIG. 5 is a diagram illustrating a rear surface of the bracket according to the embodiment.

FIG. 4 is a diagram illustrating a front surface of the bracket 300 according to the embodiment. FIG. 5 is a diagram illustrating a back surface of the bracket 300 according to the embodiment. FIG. 4 and FIG. 5 include arrows that represent directions of up, down, left, and right. The directions represented by the up, down, left, right arrows in FIG. 4 and FIG. 5 indicate the same directions as the arrows in FIG. 2 and FIG. 3. The front surface of the bracket 300 is a surface opposed to a rear surface of a surface on which the charging opening 102 of the inlet 200 is made, in a state in which the bracket 300 is coupled to the inlet 200.

The bracket 300 may be made from resin such as polybutylene terephthalate (PBT) or polycarbonate.

The bracket 300 includes a fifth coupler 304a, a sixth coupler 304b, a seventh coupler 304c, and an eighth coupler 304d. Hereinafter, the couplers 304a, 304b, 304c, and 304d of the bracket 300 are referred to as bracket side couplers 304 by omitting the alphabets attached to the end of the reference signs, in the case where it is not necessary to particularly distinguish the couplers 304a, 304b, 304c, and 304d.

The coupling bolts 211 are inserted into the respective inlet side couplers 210 of the inlet 200. The inserted coupling bolts 211 are tightened in the bracket side couplers 304. Accordingly, the first coupler 210a, the second coupler 210b, the third coupler 210c, and the fourth coupler 210d of the inlet 200 are respectively fixed to the fifth coupler 304a, the sixth coupler 304b, the seventh coupler 304c, and the eighth coupler 304d of the bracket 300. In such a way, the inlet 200 is coupled to the bracket 300.

The bracket 300 includes the first break member 310a at an upper right side of the first fixed part 302a, and includes a second break member 310b above the second fixed part 302b. Hereinafter, the break members 310a and 310b are referred to as break members 310 by omitting the alphabets attached to the end of the reference signs, in the case where it is not necessary to particularly distinguish the break members 310a and 310b. As described later, the break members are is easily breakable in comparison with the portions of the bracket 300 other than the break members 310.

The first break member 310a is disposed near the first fixed part 302a at a lower left end of the bracket 300. As described above, the thickness of the bracket 300 in the front-rear direction near the first break member 310a is the thinnest in the area between the first fixed part 302a and the fourth fixed part 302d. The break member more easily breaks when a load is applied, as the thickness of the bracket 300 in the front-rear direction gets thinner. Therefore, the first break member 310a breaks most easily when a load is applied to the area between the first fixed part 302a and the fourth fixed part 302d.

A terminal receiver 306 (to be described later) is disposed in an area surrounded by a dashed-two-dotted line, the area indicating the first break member 310a. A terminal hole 308 is made above the terminal receiver 306. The terminal hole 308 is made by creating a hole in the bracket 300. The first break member 310a breaks more easily because of the terminal hole 308 in addition to the bracket 300 having the thin thickness in the front-rear direction. Therefore, the first break member 310a breaks when a predetermined load enough to deform the vehicle body 101 is applied.

As described later, when a load is applied to the charging opening 102, the load is preferentially applied to the fixed parts 302. Therefore, when the load is applied to the charging opening 102, the load is also applied to a position near the first fixed part 302a that is one of the fixed parts 302. Subsequently, the load is applied to the first break member 310a near the first fixed part 302a. The first break member 310a breaks when the first break member 310a becomes impatient of the load. At this time, the first break member 310a breaks in the left-right direction in the area indicated by the dashed-two-dotted line, the area including the terminal hole 308. As described above, the first break member 310a is easily breakable. Therefore, when a load is applied to the charging opening 102, the first break member 310a breaks before the vehicle body 101 and the charging opening 102 deform.

The first break member 310a is disposed between the first fixed part 302a and the fifth coupler 304a. When the first break member 310a breaks, the first fixed part 302a separates from the fifth coupler 304a. At this time, the bracket side couplers 304 other than the fifth coupler 304a also separate from the first fixed part 302a. The inlet 200 is coupled to the bracket 300 via the bracket side couplers 304. Since the inlet 200 has the charging opening 102, the first fixed part 302a separates from the charging opening 102 when the first break member 310a breaks. In other words, the first fixed part 302a separates from the charging socket 214 having the charging opening 102.

When the first fixed part 302a separates from the charging socket 214, the charging socket 214 becomes released from the first fixed part 302a. This weakens the fixation of the charging socket 214 to the vehicle body 101. However, even after the first break member 310a breaks, the charging socket 214 is still fixed to the vehicle body 101 via the fixed parts 302 other than the first fixed part 302a. Therefore, the charging socket 214 is still fixed to the vehicle body 101 even after the first break member 310a breaks, whereas the charging socket 214 becomes movable from the vehicle body 101 by human power.

On the other hand, the second break member 310b is disposed between the second fixed part 302b and the sixth coupler 304b. When a load is applied to the charging opening 102, the load is also applied to the second break member 310b near the second fixed part 302b. The second break member 310b breaks when the second break member 310b becomes impatient of the load. At this time, the second break member 310a breaks along a groove formed on the rear surface of the bracket 300 in an area indicated by dashed lines. Here, the second break member 310b is easily breakable due to the groove. Therefore, when a load is applied to the charging opening 102, the second break member 310b breaks before the vehicle body 101 and the charging opening 102 deform.

When the second break member 310b breaks, the second fixed part 302b separates from the sixth coupler 304b. At this time, the bracket side couplers 304 other than the sixth coupler 304b also separate from the second fixed part 302b. The inlet 200 is coupled to the bracket 300 via the bracket side couplers 304. Since the inlet 200 has the charging opening 102, the second fixed part 302b separates from the charging opening 102 when the second break member 310b breaks. In other words, the second fixed part 302b separates from the charging socket 214 having the charging opening 102.

As described later, the first break member 310a is breakable more easily than the second break member 310b. Therefore, when a load is applied to the charging opening 102, the first break member 310a breaks first and then the second break member 310b breaks. Accordingly, when the second break member 310b breaks, the first break member 310a has already been broken. At this time, the charging socket 214 separates from the two fixed parts 302 which are the first fixed part 302a and the second fixed part 302b. Therefore, in the case where the second break member 310b is broken, the fixation of the charging socket 214 to the vehicle body 101 gets weaker than the case where only the first break member 310a is broken. Therefore, the charging socket 214 becomes more movable from the vehicle body 101.

The bracket 300 according to the embodiment is a substantially U-shaped bracket that surrounds the charging opening 102 in the state in which the inlet 200 is coupled to the bracket 300. The first fixed part 302a is disposed near a lower left end of the substantially inverted U shape. The second fixed part 302b is disposed near a lower right end of the substantially inverted U shape. The bracket 300 is not continuous between the first fixed part 302a and the second fixed part 302b. On the other hand, the bracket 300 is continuous between the third fixed part 302c and the fourth fixed part 302d in the left-right direction. Therefore, the portions near the first fixed part 302a and the second fixed part 302b are more easily breakable than the third fixed part 302c and the fourth fixed part 302d.

As described above, the bracket 300 is not continuous between the first fixed part 302a and the second fixed part 302b. Therefore, the first fixed part 302a separates from the charging opening 102 when the first break member 310a disposed above the first fixed part 302a merely breaks. In a similar way, the second fixed part 302b separates from the charging opening 102 when the second break member 310b disposed above the second fixed part 302b merely breaks. On the other hand, it is necessary to break two portions which are a lower portion and a right portion of the eighth coupler 304d to separate the eighth coupler 304d from the charging opening 102. The same applies to a case where the seventh coupler 304c separates from the charging opening 102. On the other hand, it is possible to separate the first fixed part 302a or the second fixed part 302b from the charging opening 102 by breaking only one break member 310. In other words, the first fixed part 302a and the second fixed part 302b separates from the charging opening 102 more easily.

The first fixed part 302a is disposed at a left side of a position directly below the fifth coupler 304a. On the other hand, the second fixed part 302b is disposed almost directly below the sixth coupler 304b. A distance between the first fixed part 302a and the fifth coupler 304a in the top-bottom direction is similar to a distance between the second fixed part 302b and the sixth coupler 304b in the top-bottom direction. Therefore, a distance between the first fixed part 302a and the fifth coupler 304a is longer than a distance between the second fixed part 302b and the sixth coupler 304b.

When a load is applied to the charging opening 102, the load is also applied to the bracket 300 that is coupled to the inlet 200 having the charging opening 102. The bracket 300 is coupled to the inlet 200 via the bracket side couplers 304. Therefore, when the load is applied to the charging opening 102, the load is also applied to the bracket side couplers 304. In addition, the bracket 300 is fixed to the vehicle body 101 via the fixed parts 302. Therefore, a load applied to the bracket 300 from the charging opening 102 is also applied to the fixed parts 302 of the bracket 300.

When the load is applied to the charging opening 102, the load is also applied to the fixed parts 302 via the bracket side couplers 304. Here, the distance between the first fixed part 302a and the fifth coupler 304a is longer than the distance between the second fixed part 302b and the sixth coupler 304b. Therefore, according to the principle of leverage, a load applied to a portion near the first fixed part 302a is larger than a load applied to a portion near the second fixed part 302b. In addition, as described above, since the bracket 300 is the substantially U-shaped bracket, the portions near the first fixed part 302a and the second fixed part 302b are more easily breakable than the third fixed part 302c and the fourth fixed part 302d. In addition, the first break member 310a is easily breakable because the left side wall 301a near the first break member 310a is thin. Therefore, the first break member 310a is the most breakable portion in the bracket 300 when a load is applied to the charging opening 102. In addition, the second break member 310b is the second most breakable portion in the bracket 300 after the first break member 310a, when a load is applied to the charging opening 102.

Next, function effects of the embodiment achieved in the case where the first break member 310a breaks will be described. When a large load is applied to the charging opening 102, the load is also applied to a portion near the fixed parts 302 fixed to the vehicle body 101. Since the first break member 310a is disposed near the first fixed part 302a, a load is also applied to the first break member 310a when the load is applied to the charging opening 102. As described above, the left side wall 301a near the first break member 310a is thin in the front-rear direction, and the first break member 310a has the terminal hole 308. Therefore, the first break member 310a is easily breakable. Accordingly, when a load is applied to the charging opening 102, the first break member 310a breaks in the area surrounded by the dashed-two-dotted line, the area including the terminal hole 308 as illustrated in FIG. 4.

When the first break member 310a breaks, the first fixed part 302a separates from the charging opening 102. At this time, the vehicle body 101 is released from the load applied to the vehicle body 101 from the charging opening 102 via the first fixed part 302a. Therefore, it is possible to comprehensively reduce a load applied to the vehicle body 101 from the charging opening 102 when the first break member 310a breaks. As a result, it is possible to prevent the vehicle body 101 from deforming due to a load applied to the charging opening 102 and the vehicle body 101.

In addition, the fixation of the charging socket 214 to the vehicle body 101 becomes unstable when the first break member 310a breaks and the first fixed part 302a separates from the inlet 200 having the charging opening 102. Accordingly, the charging socket 214 easily deviates from a predetermined position. Specifically, the charging socket 214 easily deviates from the predetermined position in the front-rear direction. This causes a user to notice the abnormality. At this time, it is possible for the user to immediately stop charging the battery. Accordingly, it is possible to promptly suppress electric leakage. On the other hand, sometimes a load is still applied to the charging opening 102 even after the first break member 310a breaks. In such a case, the charging socket 214 also deviates from the predetermined position easily, and it is easy for a user to notice the abnormality. Therefore, it is possible for the user to immediately remove the load applied to the charging opening 102 and the vehicle body 101. Accordingly, it is possible to suppress deformation of the vehicle body 101 and the charging opening 102.

Figure 6:
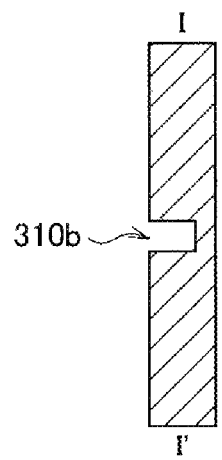
FIG. 6 is a cross-sectional view of the bracket according to the embodiment taken along a line I-I'.

Next, function effects of the embodiment achieved in the case where the second break member 310b breaks will be described. FIG. 6 is a cross-sectional view of the bracket 300 according to the embodiment taken along a line I-I' illustrated in FIG. 5. Since the groove is formed on the rear surface of the bracket 300, the second break member 310b is thinner in comparison with portions of the bracket 300 other than the second break member 310b. This enables the second break member 310b to be easily breakable.

When an excessive load is applied to the charging opening 102, the load is also applied to a portion near the fixed parts 302. Since the second break member 310b is disposed near the second fixed part 302b, a load is also applied to the second break member 310b when the load is applied to the charging opening 102. Therefore, when a predetermined load is applied to the charging opening 102, the load is also applied to the second break member 310b and the second break member 310b breaks. The fixed part 302b separates from the inlet 200 having the charging opening 102 in the case where the second break member 310b breaks. As a result, the vehicle body 101 is released from the load applied to the vehicle body 101 from the charging opening 102 via the second fixed part 302b. At this time, the first break member 310a has already been broken, the first break member 310a being more breakable than the second break member 310b. Accordingly, the vehicle body 101 is released from the load applied to the vehicle body 101 from the charging opening 102 via the first fixed part 302a and the second fixed part 302b, in the case where the second break member 310b breaks. In addition, when the second break member 310b breaks, the fixation of the charging socket 214 to the vehicle body 101 becomes more unstable in comparison with the case where only the first break member 310a breaks. For example, in the case where a user or the like who is near the vehicle body notices that the break members 310 are broken, it is possible for the user or the like who has noticed the breakage to remove a cause of the load applied to the charging opening 102. It is possible to reduce the load applied to the charging opening 102 by removing the cause of the load applied to the charging opening 102. Therefore, when the second break member 310b breaks, a load applied to the vehicle body 101 is reduced more than the case where only the first break member 310a breaks. As a result, it is possible to further prevent the vehicle body 101 from deforming due to the load applied to the charging opening 102.

In addition, the second break member 302b separates from the inlet 200 having the charging opening 102 when the second break member 310b breaks. At this time, since the first break member 310a is broken, the first fixed part 302a is also separated from the inlet 200 having the charging opening 102. Therefore, when the second break member 310b breaks, the inlet 200 separates from the first fixed part 302a and the second fixed part 302b. At this time, the fixation of the charging socket 214 to the vehicle body 101 becomes more unstable than the case where only the first break member 310a breaks. Therefore, it is easier for a user to notice the abnormality, and it is possible to immediately stop charging the battery. As a result, it is possible to prevent electric leakage before it happens.

2-3. Ground Electric Wire According to Embodiment

Figure 7:
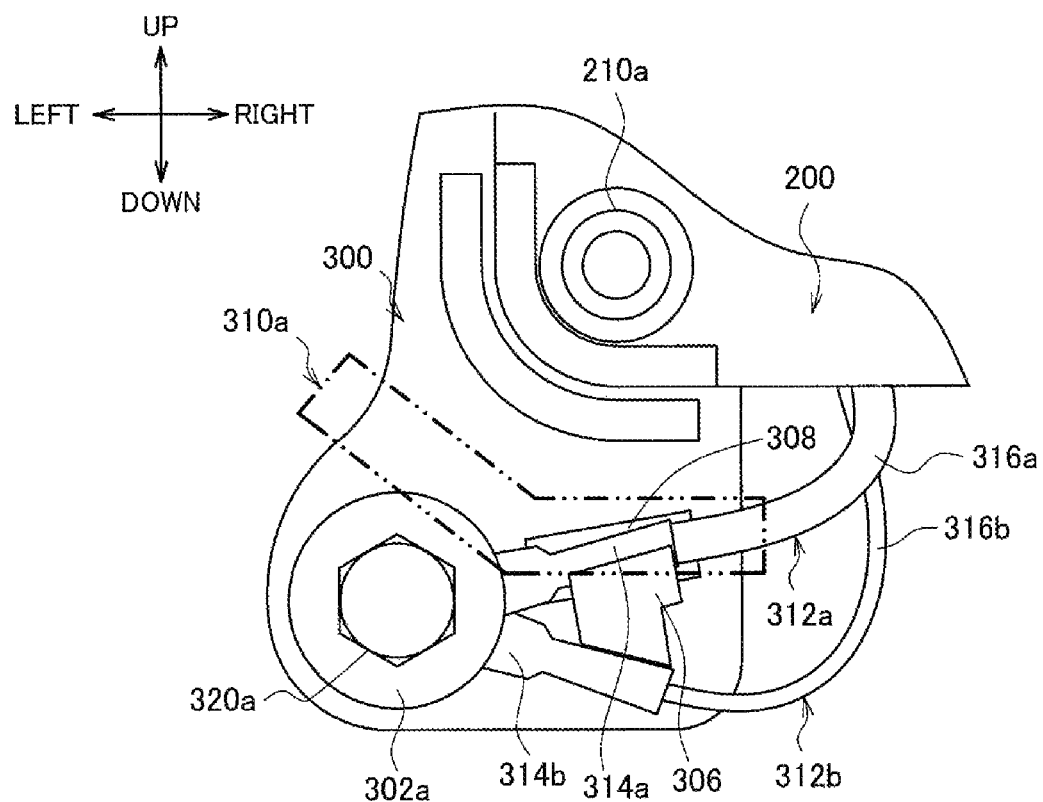
FIG. 7 is an enlarged diagram of the bracket to which ground electric wires according to the embodiment are fixed.

FIG. 7 is an enlarged diagram of the bracket 300 to which ground electric wires 312 according to the embodiment are fixed. FIG. 7 illustrates a portion near the first fixed part 302a. On the rear side of the ground terminal 208 disposed in the charging opening 102 of the inlet 200, a first ground electric wire 312a and a second ground electric wire 312b are coupled to the ground terminal 208. Hereinafter, the ground electric wires 312a and 312b are referred to as ground electric wires 312 by omitting the alphabets attached to the end of the reference signs, in the case where it is not necessary to particularly distinguish the ground electric wires 312a and 312b. The number of the ground electric wires may be one or more.

The first ground electric wire 312a includes a first terminal 314a and a first electric wire 316a. The second ground electric wire 312b includes a second terminal 314b and a second electric wire 316b. Hereinafter, the terminals 314a and 314b are referred to as terminals 314 by omitting the alphabets attached to the end of the reference signs, in the case where it is not necessary to particularly distinguish the terminals 314a and 314b. In addition, the electric wires 316a and 316b are referred to as electric wires 316 by omitting the alphabets attached to the end of the reference signs, in the case where it is not necessary to particularly distinguish the electric wires 316a and 316b. The terminals 314 are crimped to tips of the electric wires 316. In such a way, the terminals 314 are electrically coupled to the electric wires 316.

The first bolt 320a is inserted into the hole of the first fixed part 302a and the terminals 314 of the ground electric wires 312, and is tightened on the vehicle body 101. When the first bolt 320a is tightened on the vehicle body 101, the first fixed part 302a of the bracket 300 is fixed to the vehicle body 101. At this time, the terminals 314 are fixed to the first fixed part 302a. In such a way, the terminals 314 of the ground electric wires 312 and the bracket 300 are jointly fastened to the vehicle body 101 via the first bolt 320a.

In addition, both the first bolt 320a and the vehicle body 101 of the electric vehicle 100 are made of metal. The terminals 314 of the ground electric wires 312 are also made of metal. Therefore, when the terminals 314 are tightened on the vehicle body 101 via the first bolt 320a, the electric wires 316 that is electrically coupled to the terminals 314 are grounded to the vehicle body 101. In such a way, the ground electric wires 312 are grounded. When the ground electric wires 312 are grounded, the ground terminal 208 in the charging opening 102 is also grounded. The power feeding connector 104 is also grounded in the case where the power feeding connector 104 is inserted to the charging opening 102. Since the power feeding connector 104 is grounded, current flowing from the power feeding connector 104 flows to the vehicle body 101 via the ground electric wires 312 in the case of abnormality. Therefore, in the case of abnormality, it is possible to prevent electric shock from the power feeding connector 104 before it happens.

The bracket 300 includes the terminal receiver 306 on the right side of the first fixed part 302a. The terminal receiver 306 is configured such that a portion of the bracket 300 below the terminal hole 308 protrudes toward the front side, and a front side of the terminal hole 208 is covered. There is a gap between a front surface of the bracket 300 and a rear surface of the terminal receiver 308 that covers a lower portion of the terminal hole 308. The gap corresponds to a diameter of the first terminal 314a in the front-rear direction. The first terminal 314a is inserted into the gap between the front surface of the bracket 300 and the rear surface of the terminal receiver 308 that covers the lower portion of the terminal hole 308. The first terminal 314a is held such that the first terminal 314a is sandwiched between the front surface of the bracket 300 and the rear surface of the terminal receiver 306. On the other hand, the second terminal 314b is disposed along a bottom surface of the terminal receiver 306 below the terminal receiver 306.

Next, function effects of the ground electric wires 312 according to the embodiment achieved when the first break member 310a breaks will be described. The first fixed part 302a separates from the inlet 200 having the charging opening 102 in the case where a load is applied to the charging opening 102 and the first break member 310a breaks. At this time, the terminals 314 of the ground electric wires 312 are still fixed to the first fixed part 302a. In addition, the first fixed part 320a is still fixed to the vehicle body 101 via the first bolt 320a. Accordingly, the terminals 314 are still fixed to the vehicle body 101. On the other hand, when the first break member 310a breaks, the first fixed part 302a separates from the inlet 200 having the charging opening 102. Accordingly, the charging socket 214 is released from the first fixed part 302a. As a result, the charging socket 214 becomes movable from the vehicle body 101.

Sometimes a load continues to be applied to the charging opening 102 even after the first break member 310a breaks. At this time, the charging opening 102 of the charging socket 214 is pulled in a direction in which the load is applied. When the charging opening 102 is pulled, the terminals 314 of the ground electric wires 312 are pulled from the first fixed part 302a toward the charging opening 102. When the terminals 314 are pulled with great force toward the charging opening 102, the crimped portions break and the terminals 314 separate from the electric wires 316. In such a way, the terminals 314 are electrically disconnected from the electric wires 316. In other words, the ground electric wires 312 are disconnected. When the ground electric wires 312 are disconnected, a signal indicating the disconnection of the ground electric wires 312 is transmitted to the power feeding equipment 108. The power feeding equipment 108 stops feeding the power when the power feeding equipment 108 receives the signal. In such a way, it is possible to prevent electric leakage from the power feeding connector 104 without continuing the power feeding. As described above, according to the embodiment, it is possible to stop charging a battery by breaking the break members 310 and disconnecting the ground electric wires 312. Therefore, it is not necessary to prepare a mechanism for stopping charging a battery in addition to the charging socket 214.

2-4. Effects of Embodiment

As described above, according to the embodiment, the break member 310 breaks and the fixed part 302 separates from the charging opening 102 when an excessive load is applied to the charging opening 102. When the fixed part 302 separates from the charging opening, it is possible to eliminate the load applied to the fixed parts 302 via the bracket side couplers 304 from the charging opening 102. As a result, it is possible to eliminate the load applied to the vehicle body 101 via the fixed parts 302 from the charging opening 102, and it is possible to comprehensively reduce the load applied to the vehicle body 101. In such a way, the load applied to the vehicle body 101 from the charging opening 102 is comprehensively reduced, and it is possible to suppress deformation of the vehicle body 101 and the charging opening 102. Accordingly, it is possible to prevent the electric vehicle 100 from becoming unusable and it is possible to cut a cost for repairing an expensive vehicle body 101.

In addition, with regard to the charging socket 214 according to the embodiment, the inlet 200 separates from the bracket 300 when the coupling bolts 211 inserted into the inlet side couplers 210 are removed. Therefore, according to the embodiment, it is possible to separate the inlet 200 from the bracket 300. Accordingly, it is only necessary to replace the bracket 300 with a new one in the case where the bracket 300 is broken. In other words, it is not necessary to replace the whole charging socket 214 to repair the bracket 300 if the bracket 300 is broken. Therefore, it is possible to reduce a cost for repairing the charging socket 214.

3. Modification Embodiment

Although the preferred embodiments of the disclosure have been described in detail with reference to the appended drawings, the disclosure is not limited thereto. It is obvious to those skilled in the art that various modifications or variations are possible insofar as they are within the technical scope of the appended claims or the equivalents thereof. It should be understood that such modifications or variations are also within the technical scope of the disclosure.

According to the embodiment, the fixing bolts 320 are tightened on the vehicle body 101 when the fixing bolts 320 are inserted into the holes of the fixed parts 302 on the bracket 300 as illustrated in FIG. 2 and FIG. 3. Accordingly, the bracket 300 is tightened on the vehicle body 101. In such a way, the charging socket 214 including the bracket 300 is fixed to the vehicle body 101. A method of fixing the charging socket 214 to the vehicle body 101 is not limited thereto. For example, a catch may be installed on the vehicle body 101 and the bracket 300 may be engaged with the catch. Alternatively, the charging socket 214 may be fixed to the vehicle body 101 in a state in which another member is interposed between the bracket 300 and the vehicle body 101.

According to the embodiment, the coupling bolts 211 are inserted into the inlet side couplers 210 of the inlet 200, and the coupling bolts 211 are tightened on the bracket 300, as illustrated in FIG. 2 and FIG. 3. In such a way, the inlet 200 is fixed to the bracket 300, and the inlet 200 is coupled to the bracket 300. A method of coupling the inlet 200 to the bracket 300 is not limited thereto. For example, a catch may be installed on the bracket 300 and the inlet 200 may be engaged with the catch. Alternatively, the inlet 200 may be coupled to the bracket 300 in a state in which another member is interposed between the inlet 200 and the bracket 300.

According to the embodiment, the inlet 200 separates from the bracket 300 when the coupling bolts 211 inserted into the inlet side couplers 210 are removed. The embodiment is not limited thereto. The inlet 200 and the bracket 300 may be permanently affixed such that they are not separated from each other.

As illustrated in FIG. 2 to FIG. 5, the two break members 310 which are the first break member 310a and the second break member 310b are installed according to the embodiment. However, the embodiment is not limited thereto. The number of the break members 310 may be one, or the number of the break members 310 may be three or more. In addition, the break members 310 may be disposed on the inlet 200, or the break members 310 may be disposed on the inlet 200 and the bracket 300. In addition, the break members 310 may be made from the same material as the portions of the bracket 300 other than the break member 310, or may be made from material different from the portions of the bracket 300 other than the break member 310.

According to the embodiment, one of the fixed parts 302 separates from the charging opening 102 when the one or two break members 310 break. However, the embodiment is not limited thereto. The fixed part 302 may be separated from the charging opening 102 when three or more break members 310 break. Alternatively, two or more fixed parts 302 may separate from the charging opening 102 when one of the break members 310 breaks.

According to the embodiment, a user himself/herself recognizes that the charging socket 214 deviates from the vehicle body 101 by seeing breaking of the break member 310 when the break member 310 breaks. Accordingly, it is possible for the user to notice that an excessive load is applied to the charging opening 102 and to stop feeding power from the power feeding equipment 108. However, the embodiment is not limited thereto. The charging socket 214 may include a detection device for detecting breaking of the break members 310. In the case where the charging socket 214 includes the detection device, the detection device may stop feeding power from the power feeding equipment 108 when the detection device detects breaking of the break member 310.

According to the embodiment, the bracket 300 is a substantially U-shaped bracket that surrounds the charging opening 102 in the state in which the bracket 300 is coupled to the inlet 200, as illustrated in FIG. 4 and FIG. 5. However, the embodiment is not limited thereto. The bracket 300 may have a rectangular shape, a circular shape, an oval shape such that the bracket 300 surrounds the charging opening 102.

According to the embodiment, the second break member 310b is breakable due to the groove formed on the rear surface of the bracket 300 as illustrated in FIG. 5 and FIG. 6. However, the embodiment is not limited thereto. The groove may be formed on the front surface of the bracket 300, or grooves may be formed on both the front and rear surfaces. In addition, groove or the like may be formed on the break member 310 such that the bracket 300 becomes thinner in the left-right direction.

In addition, according to the embodiment, the first break member 310a breaks first and then the ground electric wires 312 gets disconnected as described with reference to FIG. 7. However, the embodiment is not limited thereto. The ground electric wires 312 may become disconnected at the same time as breaking of the first break member 310a.

According to the embodiment, the first break member 310a breaks and then the ground electric wires 312 are pulled toward the charging opening 102 by a load applied to the charging opening 102. Subsequently, the crimped portions break, the terminals 314 separate from the electric wires 316, and the ground electric wires 312 gets disconnected in the case where the load is large. However, the embodiment is not limited thereto. The ground electric wires 312 may be disconnected through electric wires 316. Alternatively, it is also possible to install another mechanism for disconnecting the ground electric wires 312 when the break member 310 breaks.

The invention claimed is:

1. A charging socket, comprising:
   at least one fixed part configured to be fixed to an electric vehicle;
   a charging opening to which a power feeding connector for charging a battery of the electric vehicle is to be inserted, the charging opening being connected to the at least one fixed part via a coupling member such that the coupling member is electrically connected to the at least one fixed part; and
   a break member configured to break and separate the charging opening from the at least one fixed part when a predetermined amount or more of load is applied to the charging opening such that the coupling member electrically disconnects from the at least one fixed part.

2. The charging socket according to claim 1, wherein the at least one fixed part comprises multiple fixed parts, and
   wherein the break member separates one or more of the multiple fixed parts from the charging opening.

3. The charging socket according to claim 1, further comprising:
   a bracket that comprises the at least one fixed part; and
   an inlet that includes the charging opening and that is configured to be coupled to the bracket.

4. The charging socket according to claim 3, wherein the bracket comprises the break member.

5. The charging socket according to claim 4, wherein the break member comprises a groove formed on the bracket.

6. The charging socket according to claim 4, wherein the break member includes a hole.

7. The charging socket according to claim 4, wherein the bracket includes a substantially U-shaped bracket configured to surround the charging opening.

8. The charging socket according to claim 7, wherein the at least one fixed part is disposed in a vicinity of at least one of both ends of the substantially U-shaped bracket, and
wherein the break member is disposed in a vicinity of the at least one fixed part.

9. The charging socket according to claim 1, further comprising:
an inlet that includes the charging opening and the coupling member includes an electric wire coupled to the charging opening.

10. The charging socket according to claim 9, further comprising:
a bracket that comprises the at least one fixed part and is electrically connected to the electric wire.

11. The charging socket according to claim 10, wherein the bracket comprises an electric wire fixing part connected to the electric wire.

12. The charging socket according to claim 11, wherein the electric wire fixing part separates from the charging opening when the break member breaks.

13. The charging socket according to claim 12, wherein the electric wire becomes disconnected when the electric wire fixing part separates from the charging opening.

14. The charging socket according to claim 9, wherein the electric wire comprises a ground electric wire.

15. The charging socket according to claim 14, wherein the ground electric wire becomes disconnected when the at least one fixed part separates from the charging opening.

16. A charging socket, comprising:
a bracket that comprises rises at least one fixed part configured to be fixed to an electric vehicle;
an inlet that comprises a charging opening to which a power feeding connector for charging a battery of the electric vehicle is to be inserted, the inlet being configured to be coupled to the bracket, and the charging opening being coupled to the at least one fixed part,
wherein the inlet further comprises a ground electric wire coupled to the charging opening,
wherein the bracket further comprises an electric wire fixing part, and
wherein the ground electric wire is fixed to the electric wire fixing part; and
a break member configured to break and separate the charging opening from the at least one fixed part when a predetermined amount or more of load is applied to the charging opening such that the ground electric wire is disconnected from the electric wire fixing part.

17. The charging socket according to claim 16, wherein the electric wire fixing part separates from the charging opening in a state in which the break member has broken, and
wherein the ground electric wire becomes disconnected in a state in which the electric wire fixing part separates from the charging opening.

18. The charging socket according to claim 17, wherein the ground electric wire and the bracket are jointly fastened to the electric vehicle at the electric wire fixing part.

19. A bracket for a charging socket, the bracket comprising:
at least one fixed part configured to be fixed to an electric vehicle;
a coupler configured to be coupled to an inlet of the charging socket, the inlet including a charging opening to which a power feeding connector for charging a battery of the electric vehicle is to be inserted, the charging opening being connected to the at least one fixed part via a coupling member such that the coupling member is electrically connected to the at least one fixed part; and
a break member configured to break and separate the coupler from the at least one fixed part when a predetermined amount or more of load is applied to the charging opening in a state where the inlet is coupled to the coupler such that the coupling member electrically disconnects from the at least one fixed part.

20. The bracket for a charging socket according to claim 19, wherein the at least one fixed part comprises multiple fixed parts, and
wherein the break member separates one or more of the multiple fixed parts from the charging opening.

* * * * *